United States Patent [19]

Alford

[11] 3,770,912

[45] Nov. 6, 1973

[54] CIRCUIT FOR AUTOMATICALLY DISCONNECTING A TEST SET FROM A TELEPHONE LINE

[75] Inventor: William Douglas Alford, St. Lambert, Quebec, Canada

[73] Assignee: Bell Canada, Montreal, Quebec, Canada

[22] Filed: July 5, 1972

[21] Appl. No.: 269,121

[52] U.S. Cl. ......... 179/175.2 C, 179/175.3, 340/253
[51] Int. Cl. .......................................... H04m 3/22
[58] Field of Search .................. 179/175.3, 175.2 C, 179/1 MN, 2 A; 340/253, 256

[56] References Cited

UNITED STATES PATENTS 3,564,143 2/1971 Stewart .............................. 179/2 A
3,601,561 8/1971 Bennett ............................ 179/175.3
3,266,018 8/1966 Higgins ............................. 179/2 A
3,588,357 6/1971 Sellari ............................... 179/2 A

*Primary Examiner*—William C. Cooper
*Assistant Examiner*—Douglas W. Olms
*Attorney*—Frank Turpin

[57] ABSTRACT

The invention provides a circuit for automatically disconnecting a test set from a telephone line when the subscriber requests service. Switch means connected to the telephone line are responsive to the direct current flowing through the telephone line when the subscriber goes off-hook for automatically disconnecting the test set from the subscriber telephone line.

5 Claims, 1 Drawing Figure

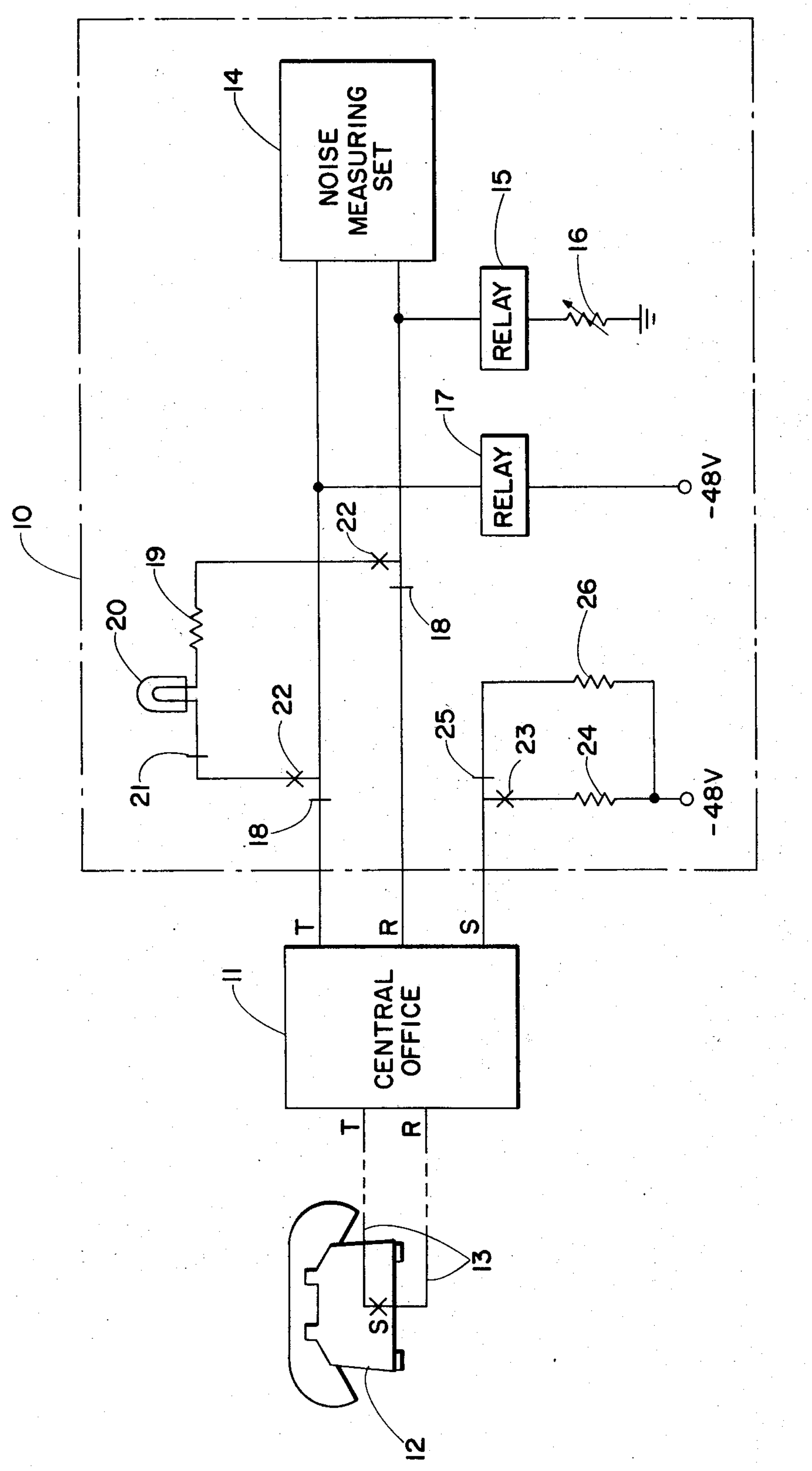
NOISE MEASURING SET
RELAY
RELAY
-48V
-48V
CENTRAL OFFICE
T
R
S
T
R
S

CIRCUIT FOR AUTOMATICALLY DISCONNECTING A TEST SET FROM A TELEPHONE LINE

This invention relates generally to telephone plant test sets and more particularly to an improved noise survey set.

In order to maintain quality and uniformity of service, telephone operating companies periodically measure the performance of telephone plants. One aspect of this activity is the noise component of the subscriber plant transmission index. This activity consists in taking an annual survey of the noise component which appears on a large number of subscriber loops. The results of the survey are tabulated and statistically analyzed to provide meaningful information to the operating company regarding the quality of the transmission facilities of the telephone plant.

The measurement of the noise component on the subscriber line consists in posting the loop through a switching center or central office and measuring the open loop noise component thereon. In effect, a noise measuring set located in a central office is connected directly to a subscriber line via a subscriber line circuit in the central office. During the testing of the line, the cutoff relay in the subscriber line circuit is held operated, cutting off dial tone and talk battery and causing an out-of-service condition if the subscriber attempts to use his set. This mode of operation has proven to be unacceptable to the subscriber who is denied the use of his telephone for the duration of the measurements. This procedure is also undersirable from a safety point of view. If the subscriber was faced with an emergency and required assistance from the authorities or the fire department, he would be placed in a vexatious position.

It is an object of the invention to provide a circuit which eliminates this problem. The circuit of the invention provides a means whereby the test set which is connected to a subscriber's line becomes automatically disconnected from that line when the subscriber goes off-hook.

Therefore, in accordance with the invention I provide a noise survey set comprising a noise measuring set and means for connecting the noise measuring set directly to a subscriber telephone line through a central office. Switch means connected to the telephone line are responsive to the direct current flowing through the telephone line when the subscriber goes off-hook for automatically disconnecting the noise measuring set from the telephone line.

An example embodiment of the invention will now be described in conjunction with the drawing which is a schematic diagram of a noise survey set connected to a subscriber set through a central office.

A noise survey set normally comprises a modified key telephone and a noise measuring set. The keys are used to realize functions such as seizure of the telephone line, monitor, test, dial, loop release and connector release. However, since noise survey sets have been used extensively and are therefore well known in the art, only that portion of the set which is necessary to illustrate the invention is shown.

The drawing shows a noise survey set 10 connected to a central office 11 via a telephone line having tip (T) and ring (R) leads. The noise survey set is also connected to a subscriber line circuit (not shown) in the central office by a control or sleeve (S) lead.

The noise survey set 10 is shown to comprise a noise measuring set 14 connected directly to the subscriber telephone line 13 via the central office 11 and the tip and ring leads. A noise measuring set often used in this apparatus is the Western Electric model 3A. A first relay 15 has one end connected to the ring lead of the telephone line and its other end connected to ground through a variable resistance element 16. A second relay 17 has one end connected to a source of voltage (−48V) and its other end connected to the tip lead of the telephone line. Each one of a pair of break contacts 18 is serially connected in a respective side of the telephone line at a location intermediate of the relays 15 and 17 and the central office 11.

A holding bridge comprising a resistance element 19, an indicating lamp 20 and a break switch 21 is connectable across the tip and ring leads of the telephone line and across the relays 15 and 17 through a pair of make contacts 22.

The switch 21 may be any manually operable break switch while the indicating lamp 20 may also be any other indicating means such as a buzzer. The resistance element 19 serves to limit the current through relays 15 and 17 when contacts 22 are operated.

Break contacts 18 and make contacts 22 are operable in response to the operation of one or both of relays 15 and 17. Also, contacts 18 and 22 may conveniently be a pair of transfer contacts.

Due to circuit tolerances and necessary sensitivity of relays 15 and 17, it may be desirable to provide a third relay operable in response to the operation of relays 15 and 17. This third relay would then cause contacts 18 and 22 to operate.

The impedance of relay 15 should be approximately equal to the impedance of relay 17 in order to maintain balance of the telephone line. A variable resistance element 16 is provided for adjusting the relative impedances of the relay paths.

The noise survey set 10 is also connected to the central office 11 and more particularly to a subscriber line circuit therein via the sleeve (S) lead which acts as a control lead. The sleeve lead is shown connected to a source of voltage (−48V) through a make contact 23 and a resistance element 24 which would normally be about 1,500 ohms. The sleeve lead is also connected to the −48V supply through break contact 25 and resistance element 26 which is normally about 3,900 ohms. Contacts 23 and 25 are preferably automatically operable in response to the operation of relays 15 and 17 but may also be manually operable.

OPERATION

Let us assume that a subscriber line has been posted. That is, the noise survey set 10 is connected to a subscriber telephone set 12 via a subscriber line circuit and a truck in the central office 11. The tip and ring leads of the noise survey set 10 are now directly connected to the tip and ring leads of the subscriber telephone line 13 and the sleeve lead is connected to 3900 ohm battery through break contact 25 for busying the subscriber line circuit. The noise component of the open-looped subscriber line 13 may now be measured using the noise measuring set 14.

Let us now assume that the subscriber requires service and consequently goes off-hook. This action causes the make switch S in the subscriber telephone set 12 to operate thereby closing the loop. Current flows from the —48V voltage supply through relay 17, the tip lead, the subscriber set 12, the ring lead, and the relay 15 to ground. Relays 15 and 17 operate causing break contacts 18 to operate, thereby disconnecting the noise measuring set 14 from the telephone line 13. Also, make contacts 22 operate to connect the holding bridge across relays 15 and 17 to hold them operated. Make and break contacts 23 and 25 also operate to disconnect 3,900 ohm battery from the sleeve lead and connect 1,500 ohm battery thereto, thereby releasing the subscriber line circuit. The lamp 20 glows, thereby indicating to the tester that the noise measuring set 14 has been disconnected and that the subscriber has been given the use of his facility.

It should be realized that although the circuit of the invention is realized using a pair of multicontact relays, other switch means such as a double-winding relay or semiconductor switches may conceivably be used.

What is claimed is:

1. In a noise survey set comprising a noise measuring set and means for connecting the noise measuring set directly to a subscriber telephone line through a subscriber line circuit in a central office, an automatic disconnect circuit comprising, a first switch means having a predetermined impedance and being connected to one side of the telephone line, a second switch means having a predetermined impedance and being connected to the other side of the telephone line, the impedances of said switch means being substantially equal to each other and being large relative to the impedance of the telephone line, said switch means being responsive to the direct current flowing through the telephone line when the subscriber goes off-hook for automatically disconnecting the noise measuring set from the subscriber line circuit, thereby releasing the subscriber telephone line.

2. A circuit as defined in claim 1 wherein said switch means comprise, first and second relays, the first relay having one end connected to one side of the telephone line and its other end connected to ground, the second relay having one end connected to the other side of the telephone line and its other end connected to a source of voltage, a pair of break contacts, each one serially connected in a respective side of the telephone line at a location intermediate said relays and the central office, said break contacts being operable in response to the operation of said relays.

3. A circuit as defined in claim 2 wherein the connection of the noise survey set to the subscriber line circuit includes a control lead and wherein said disconnect circuit further comprises switch means operable in response to the operation of said relays for connecting a release signal to said control lead.

4. A circuit as defined in claim 3 further comprising, a holding bridge, and a pair of make contacts operable in response to the operation of said relays for connecting said holding bridge across said relays.

5. A circuit as defined in claim 4 wherein said holding bridge includes an indicating means which is activated when said relays operate.

* * * * *